United States Patent [19]

Iizuka

[11] Patent Number: 5,777,774
[45] Date of Patent: Jul. 7, 1998

[54] REFLECTION SCANNING OPTICAL SYSTEM

[75] Inventor: Takashi Iizuka, Tokyo, Japan

[73] Assignee: Asahi Kogaku Kogyo Kabushiki Kaisha, Tokyo, Japan

[21] Appl. No.: 744,425

[22] Filed: Nov. 7, 1996

[30] Foreign Application Priority Data

Nov. 8, 1995 [JP] Japan .................. 7-314729

[51] Int. Cl.⁶ .................................. G02B 26/08
[52] U.S. Cl. ................. 359/208; 359/207; 359/216; 359/217
[58] Field of Search ................. 359/205–208, 359/216–219, 729–732; 347/258–261

[56] References Cited

U.S. PATENT DOCUMENTS 5,220,449  6/1993  Kuroda ................... 359/208
5,408,095  4/1995  Atsuumi et al. ........... 359/208

FOREIGN PATENT DOCUMENTS 4-245214  9/1992  Japan .

*Primary Examiner*—James Phan
*Attorney, Agent, or Firm*—Greenblum & Bernstein, P.L.C.

[57] ABSTRACT

A reflection type scanning optical device comprises a rotatable polygonal mirror arranged so that a light beam deflected from the polygonal mirror is separated from the light beam incident thereto, a first curved mirror having a negative power in the main scanning direction to reflect the deflected light beam from the polygonal mirror toward the polygonal mirror, a second curved mirror having a positive power in the main scanning direction to reflect the light beam reflected from the first curved mirror toward the first curved mirror, and a toric lens having a positive power at least in the auxiliary scanning direction to converge the light beam reflected from said second curved mirror and to form a spot on a surface to be scanned.

14 Claims, 11 Drawing Sheets

FIG. 10
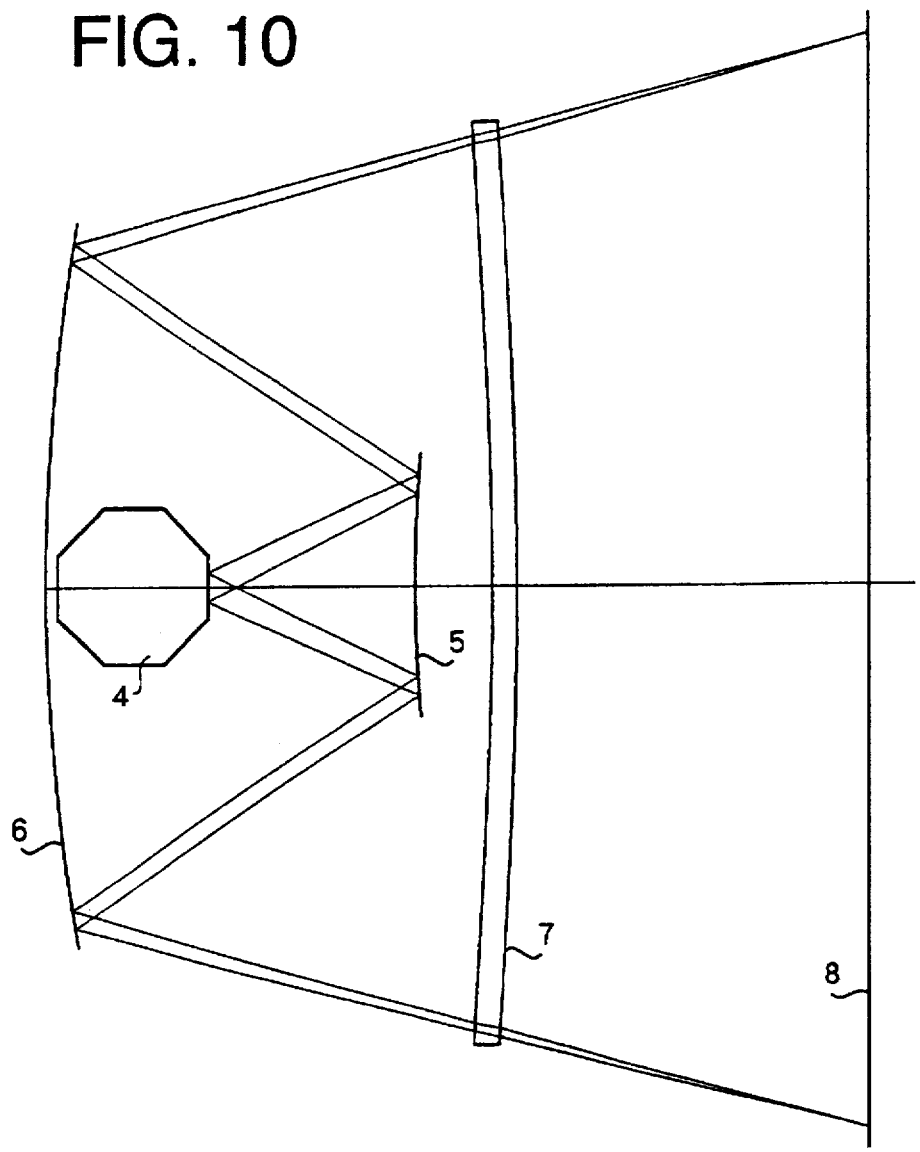
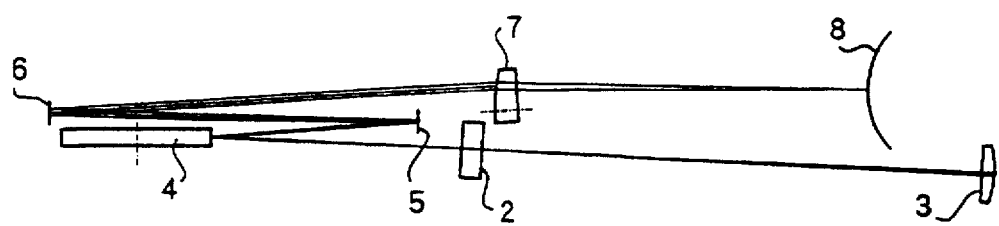
FIG. 11

FIG. 13
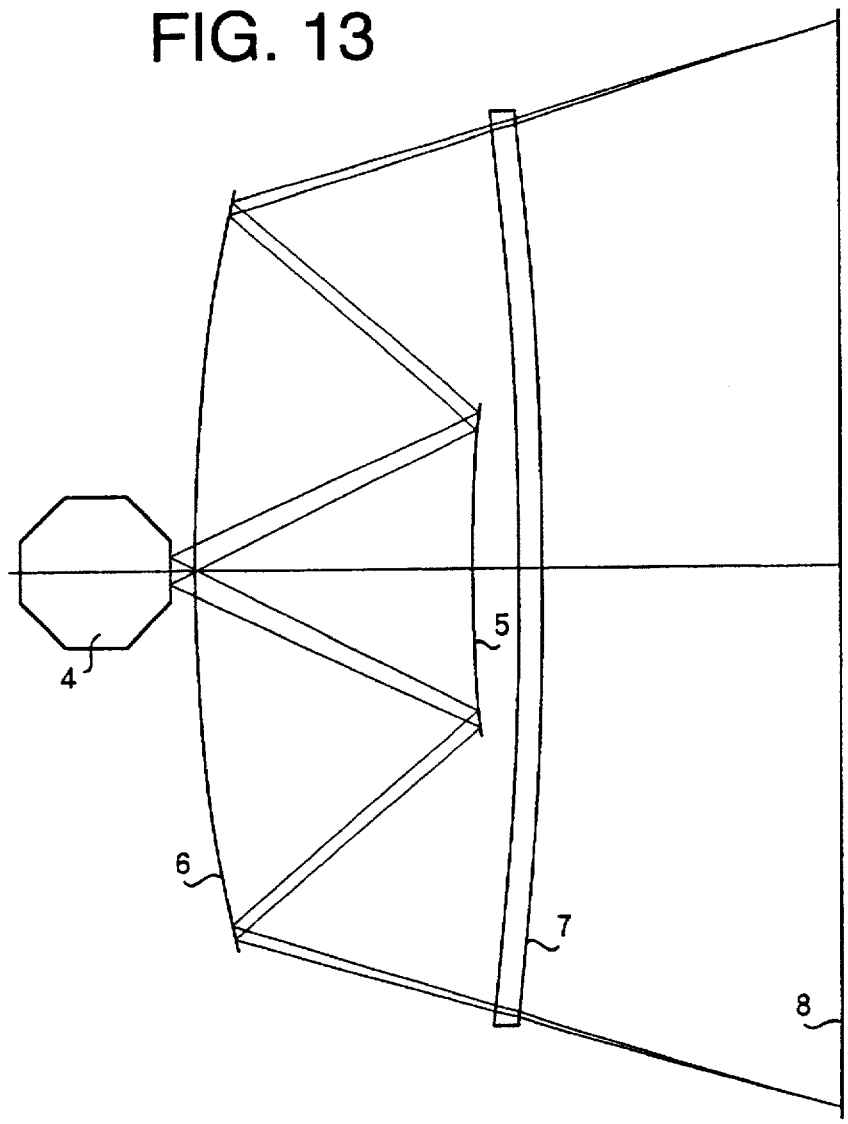
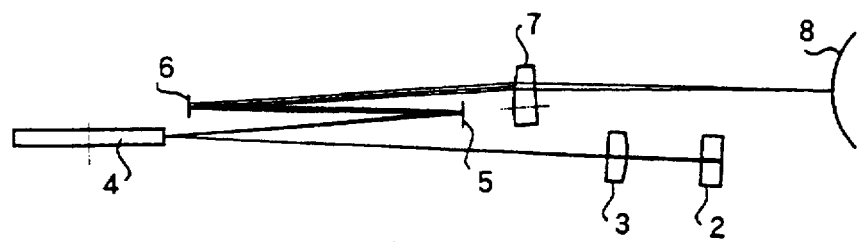
FIG. 14

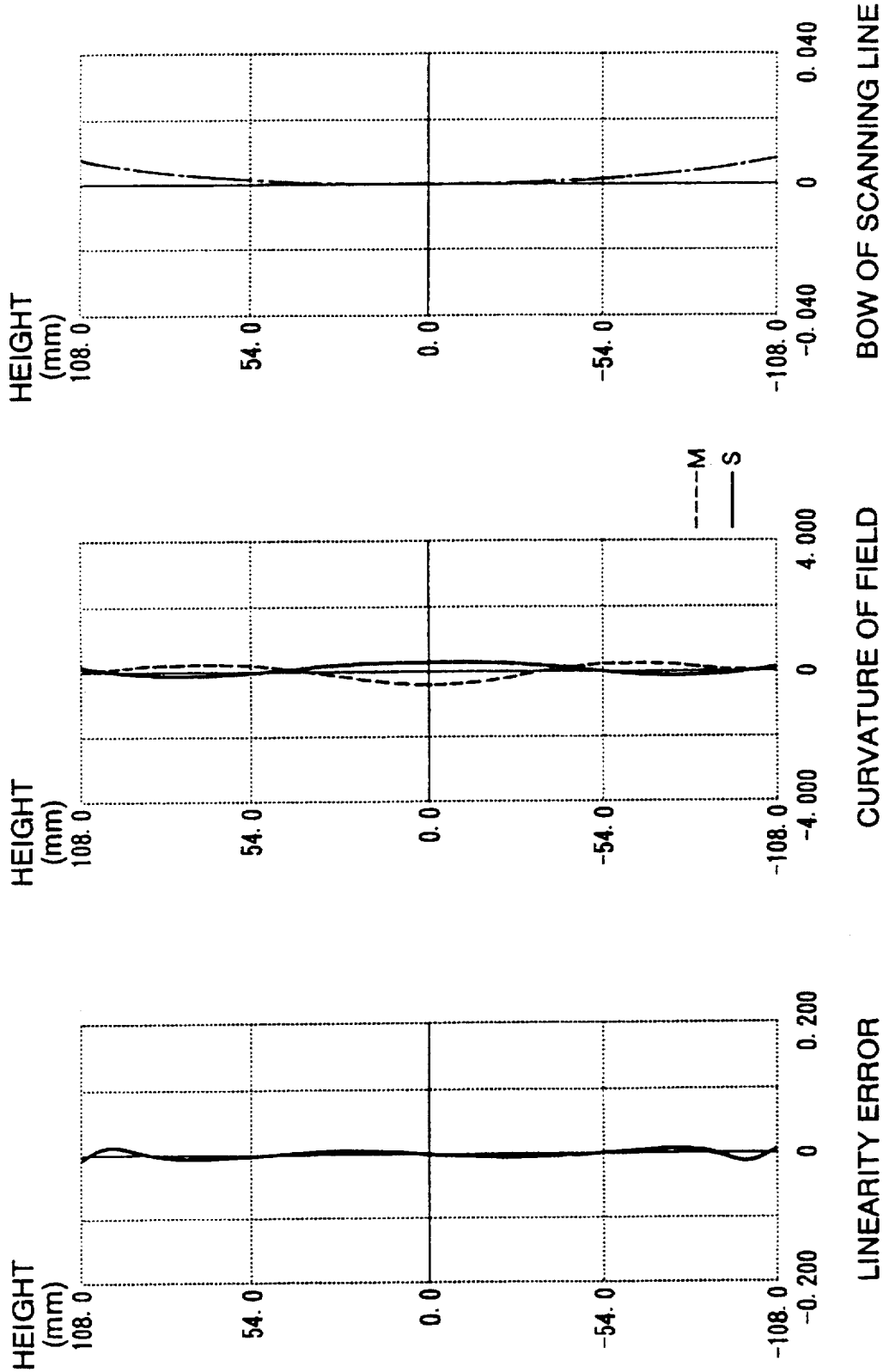

1

REFLECTION SCANNING OPTICAL SYSTEM

BACKGROUND OF THE INVENTION

The present invention relates to a scanning optical system used for a laser beam printer or a laser facsimile machine. In particular, the present invention relates to a scanning optical system including a curved mirror instead of a scanning lens.

Japanese Laid open patent publication No. Hei 4-245214 discloses such a scanning optical system. The optical system disclosed in the publication includes a semiconductor laser, a polygonal mirror to deflect the laser beam from the semiconductor laser, and a mirror system that includes a convex spherical mirror (a first mirror) and a concave spherical mirror (a second mirror) to form a spot of the deflected laser beam on a surface to be scanned (an object surface).

Since the conventional scanning optical system disclosed in the Japanese publication is provided with only two spherical mirrors for converging the laser beam, the radiuses of curvature of the mirrors are restricted in a small range in order to maintain constant scanning speed and to reduce curvature of field.

For instance, if the divergent power of the first mirror were raised, an optical path length from the first mirror to the object surface would be reduced such that the optical system is more compact while keeping the scanning width in the main scanning direction. However, at the same time, the radius of curvature of the first mirror must be kept to the designed value to avoid deterioration of curvature of field in an auxiliary scanning direction. Accordingly, the optical system cannot be made more compact according to the design disclosed.

SUMMARY OF THE INVENTION

It is therefore an object of the present invention to provide an improved reflection type optical scanning device that allows the design of the optical system to be made more compact.

In order to achieve the object of the invention, the reflection type scanning optical device includes a rotatable polygonal mirror arranged so that a light beam reflected from the polygonal mirror is separated from the light beam incident thereto in an auxiliary scanning direction, a first curved mirror having a negative power in the main scanning direction to reflect the deflected light beam from the polygonal mirror back toward the polygonal mirror, a second curved mirror having a positive power in the main scanning direction to reflect the light beam reflected from the first curved mirror back toward the first curved mirror, and a toric lens having a positive power in the auxiliary scanning direction to converge the light beam reflected from said second curved mirror and to form a spot on a surface to be scanned (an object surface).

Each of the first and second curved mirrors are arranged so that a reflected light beam is separated from an incident light beam in the auxiliary scanning direction.

In this specification, the term "an optical axis of an optical system" is defined as an axis that coincides with the principal ray when the spot formed on the object surface strikes the center of the scanning area. The term "the main scanning direction" is defined as a direction in a plane perpendicular to the optical axis that corresponds to the scanning direction of the spot on the object surface, and "the auxiliary scanning direction" is defined as a direction perpendicular to the main

2 scanning direction in a plane perpendicular to the optical axis Additionally, a plane that includes both the optical axis of the optical system containing the first and second curved mirrors and a rotational axis of the polygonal mirror is defined as "an auxiliary scanning plane".

Since the optical path is "folded" by the reflection by the two mirrors, the optical system is made compact while keeping a predetermined optical path length from the polygonal mirror to the object surface.

Additionally, since the reflected light beam from the polygonal mirror is separated from the incident light beam in the auxiliary scanning direction, the relationship of these light paths can be freely determined in the main scanning direction. In the case where the principal ray of the incident light beam to the polygonal mirror is included in the auxiliary scanning plane, the angle formed between the incident light beam and the reflected light beam in the main scanning direction varies symmetrically with the optical axis in accordance with the change of the deflecting angle. In such a case, aberrations can be easily corrected by using a symmetrical optical system in the main scanning direction, because the wavefront of the light beam on the object surface varies symmetrically with the scanning center.

Further, the use of a toric lens allows a larger range of design for the first and second curved mirrors. Particularly, since the toric lens functions to compensate the curvature of field in the auxiliary scanning direction, the curvature of field can be reduced even if the radius of curvature of the first curved mirror is changed. Therefore, since the divergent power of the first curved mirror can be increased, the optical path between the first curved mirror and the object surface can be shortened while keeping a predetermined scanning width. That is, the optical system may be made more compact without changing the aberration and the scanning width.

Since the separation angle formed between the incident light beam to the polygonal mirror and the deflected light beam in the auxiliary scanning direction varies in accordance with the deflection angle, the scanning line formed on the object surface as a locus of the spot is curved like a bow. Preferably, the following condition (1) should be satisfied to reduce the bow of the scanning line;

$$P1s > P1m \quad (1)$$

where

P1s is a power of the first curved mirror in the auxiliary scanning direction; and P1m is a power of the first curved mirror in the main scanning direction.

Furthermore, preferably, the following condition (2) is satisfied to keep the relatively large scanning width;

$$|R1m| < |R2m| \quad (2)$$

where

R1m is a radius of curvature of the first curved mirror in the main scanning direction; and R2m is a radius of curvature of the second curved mirror in the main scanning direction.

BRIEF DESCRIPTION OF THE DRAWINGS

FIG. 10 shows an arrangement of a reflecting type scanning optical system according to the third embodiment, showing the main scanning direction;

FIG. 11 shows the arrangement of the optical system shown in FIG. 10 in the auxiliary scanning direction;

FIG. 13 shows an arrangement of a reflecting type scanning optical system according to the fourth embodiment, showing the main scanning direction;

FIG. 14 shows the arrangement of the optical system shown in FIG. 13 in the auxiliary scanning direction; and FIGS. 15(A), 15(B) and 15(C) show the linearity error, the curvature of field and the bow of the scanning line, respectively, according to the fourth embodiment.

DETAILED DESCRIPTION OF THE PREFERRED EMBODIMENTS

Figure 1:
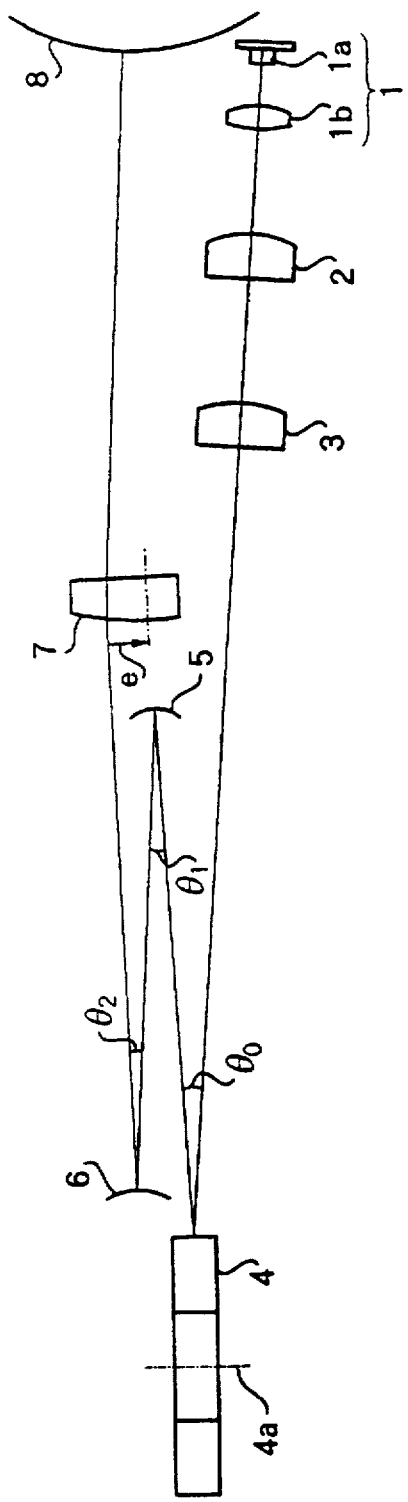
FIG. 1 shows a generic arrangement of the reflecting type scanning optical system of the present invention, showing the auxiliary scanning direction.
Figure 2:
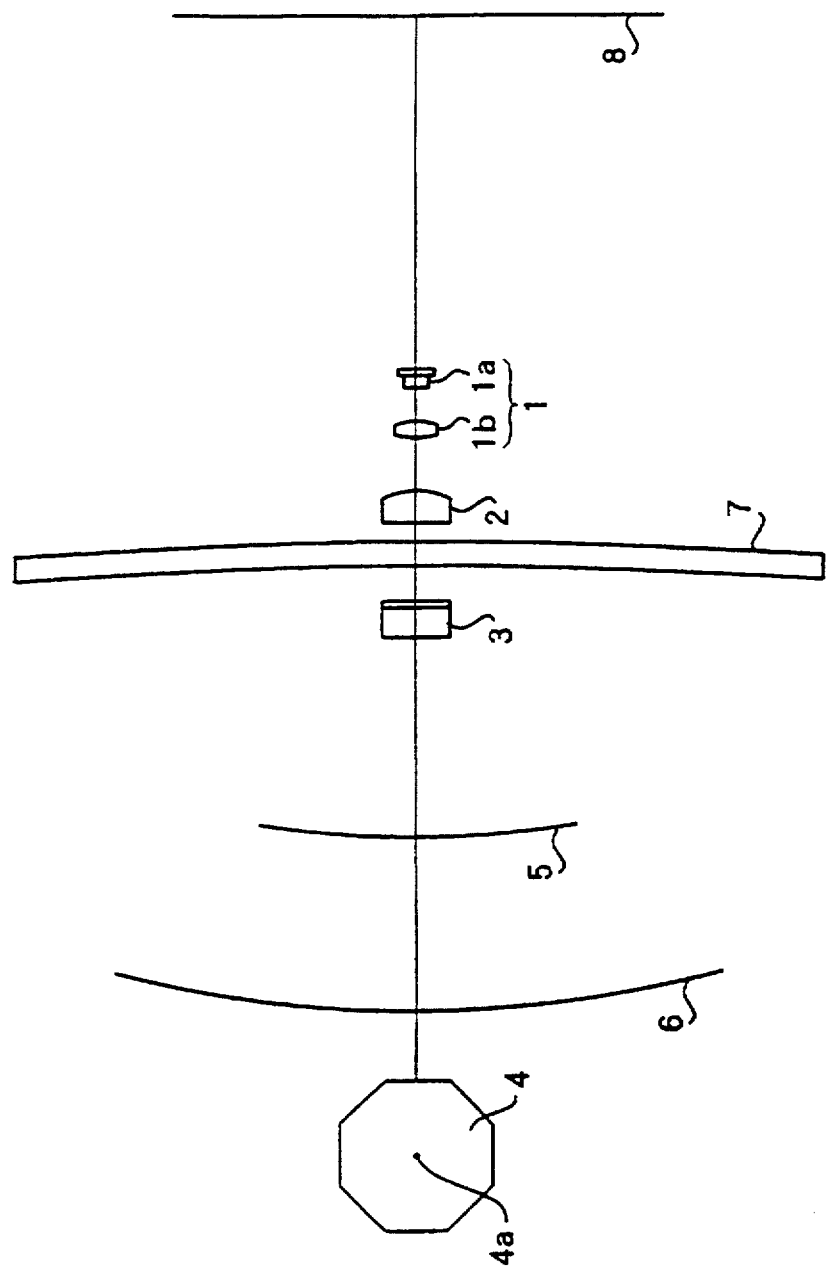
FIG. 2 shows the arrangement of the optical system shown in FIG. 1, in the main scanning direction.

FIGS. 1 and 2 show a generic scanning optical system of the embodiment of the present invention. FIG. 1 is a sectional view showing the auxiliary scanning direction and FIG. 2 is a sectional view showing the main scanning direction.

A light source portion 1 includes a semiconductor laser 1a, for emitting a laser beam and a collimator lens 1b, for converting a divergent light from the semiconductor laser 1a into a parallel light beam. The laser beam emitted from the light source portion 1 transmits through an objective lens 2 and a cylindrical lens 3 and is incident on a polygonal mirror 4.

The objective lens 2 is a rotationally symmetric lens having even power in the main and auxiliary scanning directions. The cylindrical lens 3 has positive power only in the auxiliary scanning direction. The laser beam emitted from the light source portion 1 is converged by the objective lens 2 and forms a linear image near the reflecting surface of the polygonal mirror 4 by means of the cylindrical lens 3.

Since the incident laser beam from the light source portion 1 has a predetermined incident angle, in the auxiliary scanning direction, when incident on the reflecting surface of the polygonal mirror 4, the reflected light beam is separated from the incident light beam, in the auxiliary scanning direction, as shown in FIG. 1.

The reflected and deflected laser beam from the polygonal mirror 4 is once reflected by a first curved mirror 5 back toward the polygonal mirror, and is then reflected by a second curved mirror 6 toward a photoconductive drum 8. The laser beam reflected by the second curved mirror 6 is incident on a toric lens 7 (located between the second curved mirror 6 and the photoconductive drum 8) and the laser light is converged on the photoconductive drum 8, forming a spot thereon. The spot scans in the main scanning direction as the polygonal mirror 4 rotates.

The first curved mirror 5 has a negative power in the main scanning direction and has a weak positive power in the auxiliary scanning direction. The second curved mirror 6 has a positive power in the main scanning direction and has a weak negative power in the auxiliary scanning direction. The first and second curved mirrors 5 and 6 are arranged so that the reflected light beams are separated from respective incident light beams. In this embodiment, the light beam from the light source portion 1 is reflected in steps (upwardly in FIG. 1) as the light beam is reflected up by the polygonal mirror 4, by the first curved mirror 5 and by the second curved mirror 6.

As shown in FIG. 2, the center axis of the incident light on polygonal mirror 4 is included in an auxiliary scanning plane that includes two axes: the optical axis of the optical system containing the first curved mirror 5, the second curved mirror 5, and the toric lens 7, and a rotation axis 4a of the polygonal mirror 4.

This arrangement of the polygonal mirror 4 allows a relatively large deflecting angle range with respect to the size of the polygonal mirror 4. Accordingly, the scanning width is larger at a given size of the polygonal an mirror 4. Conversely, the size of the polygonal mirror 4 can be smaller at a given scanning width. Additionally, since the curvature of field occurs symmetrically with the optical axis, it becomes easier to correct the curvature of field.

The first curved mirror 5 is designed so as to satisfy the following condition (1).

$$Pls > Plm \quad (1)$$

where

Pls is a power of the first curved mirror in the auxiliary scanning direction; and Plm is a power of the first curved mirror, in the main scanning direction.

If the power of the first curved mirror 5 in the auxiliary scanning direction is similar to that in the main scanning direction, that is, having a similar negative power, the variation of the separation angle due to the change of the deflecting angle becomes relatively large. In other words, the difference between the separation angle at the center of the scanning area and the separation angle at the periphery becomes larger.

However, the variation of the separation angle is reduced when the first curved mirror 5 does not have a stronger negative power in the auxiliary scanning direction than in the main scanning direction. Since the variation of the separation angle corresponds to the amount of the bow of the scanning line, the bow of the scanning line can be reduced when the variation of the separation angle is reduced- As the power of the first curved mirror 5 in the auxiliary scanning direction larger than the power in the main scanning direction, as expressed in the condition (1), the bow of the scanning line can be reduced.

In order to satisfy the condition (1), the shape of the first curved mirror 5 in the auxiliary scanning direction must be one of: a convex surface which has a negative power weaker than that in the main scanning direction, a flat surface having no power, or a concave surface having a positive power. Both the variation of the separation angle (in accordance with the change of the deflecting angle) and the bow of the scanning line can be reduced when the condition (1) is satisfied. In this embodiment, the first curved mirror 5 has a concave surface in the auxiliary scanning direction.

Figure 3A:
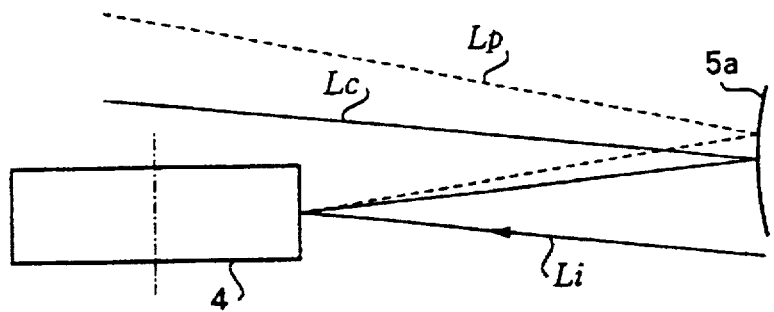
FIGS. 3(A), 3(B) and 3(C) show relationships between the curvature of a first curved mirror and the variation of the separation angle in the auxiliary scanning direction.
Figure 3B:
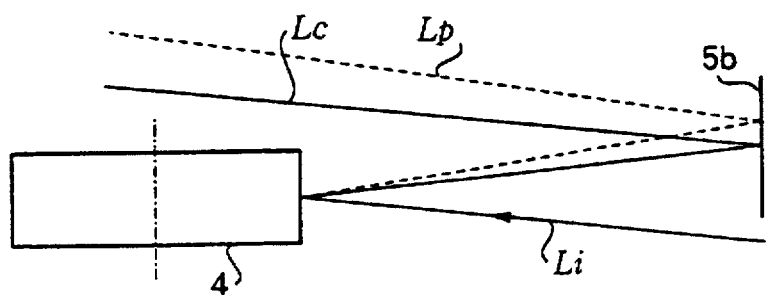
Figure 3C:
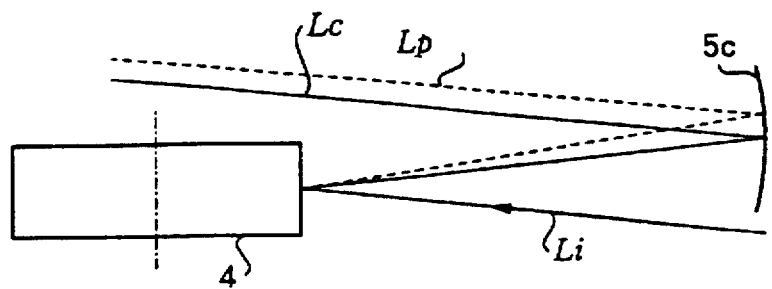

FIGS. 3(A), 3(B) and 3(C) show relationships between the curvature of the first curved mirror and the variation of the separation angle (between the incident and reflected light beams in the auxiliary scanning direction). FIG. 3(A) shows the case where the first curved mirror 5 has a convex surface 5a, FIG. 3(B) shows a flat surface 5b and FIG. 3(C) shows a concave surface 5c.

For a given incident light beam Li, the reflected light directed to the center of the scanning area is represented by a solid line Lc, while the reflected light directed to the periphery of the scanning area is represented by a dotted line Lp. The difference in the separation angle between the reflected lights Lc and Lp is largest with the convex surface 5a shown in FIG. 3(A) and smallest with the concave surface 5c shown in FIG. 3(C). Since the difference in the separation angle corresponds to the amount of the bow of the scanning line on the photoconductive drum 8, the concave surface 5c shown in FIG. 3(C) is preferable to reduce the bow.

The first and second curved mirrors 5 and 6 are designed so as to satisfy the following condition (2);

$$|R1m| < |R2m| \qquad (2)$$

where

R1m is a radius of curvature of the first curved mirror in the main scanning direction; and R2m is a radius of curvature of the second curved mirror in the main scanning direction.

Since the first curved mirror has a negative power in the main scanning direction, the deflecting angle range by the polygonal mirror is enlarged by the first curved mirror. This magnification m of the deflecting angle range is represented by the following equation.

$$m = (R1m + 2a)/R1m$$

where a is a distance between the reflecting surface of the polygonal mirror and the first curved mirror along the optical axis.

Accordingly, the absolute value |R1m| of the radius of curvature of the first curved mirror in the main scanning direction should be made as small as possible, in order to obtain a larger magnification m and thus a larger deflecting angle range. On the other hand, in order to maintain the scanning width, the absolute value |R2m| of the radius of curvature of the second curved mirror in the main scanning direction should not be reduced. That is, if the positive power of the second curved mirror is too large (i.e., the radius of curvature is too small) the scanning width is reduced. When the condition (2) is satisfied, the scanning width can be relatively large while keeping a predetermined magnification m.

Further condition (2) is satisfied, the scanning width can become relatively large while keeping a predetermined magnification m. Preferably, the radius of curvature R1m should satisfy the following condition (3) to obtain an effective magnification m;

$$2f/3 < |R1m| < f \qquad (3)$$

where f denotes the focal length of the whole optical system in the main scanning direction.

On the other hand, the radius of curvature R2m should satisfy the following condition (4);

$$f < |R2m| < 2f \qquad (4).$$

The laser beam is first converged by the objective lens 2, and is then diverged by the first curved mirror 5, thereby becoming to be almost parallel light beam when incident on the second curved mirror 6. Therefore, the positive power required for the second curved mirror is weaker than the negative power required for the first curved mirror 5.

The separation angles at the polygonal mirror 4, the first curved mirror 5, and the second curved mirror 6 also vary in accordance with the deflecting angle. In the following description, the angle θ0 is defined as a separation angle at the polygonal mirror 4 satisfying the condition that the laser light beam emitted from the light source portion 1 strikes the photoconductive drum 8 at the center of the main a scanning direction. The angles θ1 and θ2 are defined respectively, as separation angles at the first curved mirror 5 and at the second curved mirror 6 satisfying the same condition as the definition of the angle θ0.

The optical elements are arranged so that the angle between the incident light beam to the polygonal mirror 4 and the reflected light beam from the second curved mirror 6 is equal to the sum of the separation angles θ0, θ1 and θ2. That is, the optical path is "folded" in the auxiliary scanning plane, and the reflected light beam is separated from the respective incident light beam in an upper direction from the viewpoint of FIG. 1.

The toric lens 7 has a meniscus shape having almost no power in the main scanning direction, and having a positive power in the auxiliary scanning direction. One surface of the toric lens (on the second curved mirror 6 side) is formed as a toric surface having a radius of curvature in the auxiliary scanning direction smaller than that in the main scanning direction. The other surface of the toric lens (on the photoconductive drum 8 side) is spherical. The toric lens 7 is arranged such that the optical axis of the toric lens 7 is offset from the optical axis of the beam from the first and second curved mirrors 5 and 6 (in the lower direction from the viewpoint of FIG. 1) by a distance e.

Since the light beam from the light source portion 1 is incident on the polygonal mirror 4 at a predetermined incident angle in the auxiliary scanning direction, the deflected light beam is distorted as the deflecting angle changes. For instance, a linear image is formed near the reflecting surface of the polygonal mirror 4 by means of the cylindrical lens 3 in the embodiment, and the direction of the linear image varies in accordance with the deflecting angle. This distortion generates a skew aberration in the spot formed on the photoconductive drum 8.

In this embodiment, the skew aberration is corrected by the offset (i.e., off-centered) arrangement of the toric lens 7 When the toric lens 7 is arranged at on offset position, since the distortion of the incident light beam can be adjusted in any angle with respect to the generating line of the toric lens 7, the skew aberration of the light beam can be controlled. The skew aberration is, therefore, able to be corrected by means of the toric lens 7 arranged at an offset position.

Four embodiments with concrete numerical constructions are described hereinafter.

FIRST EMBODIMENT

Figure 4:
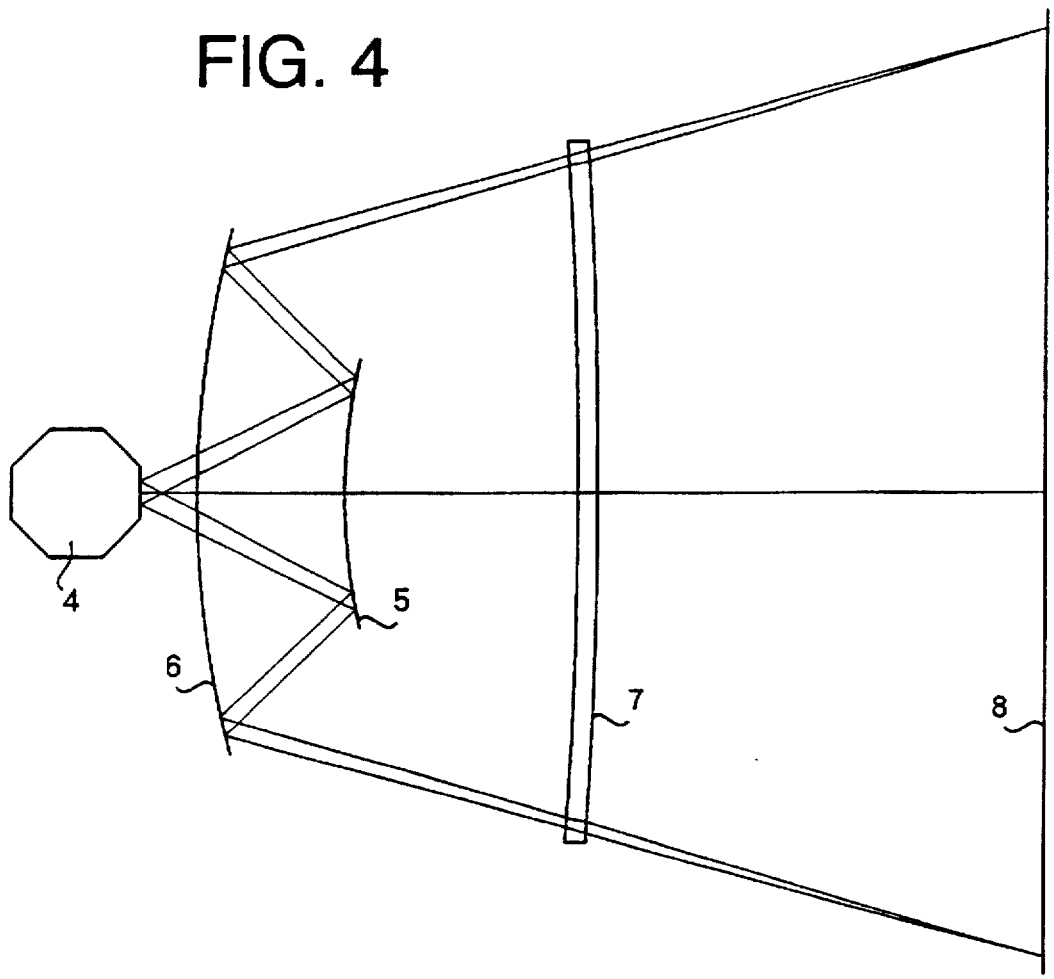
FIG. 4 shows an arrangement of the reflecting type scanning optical system according to a first embodiment showing the main scanning direction.
Figure 5:
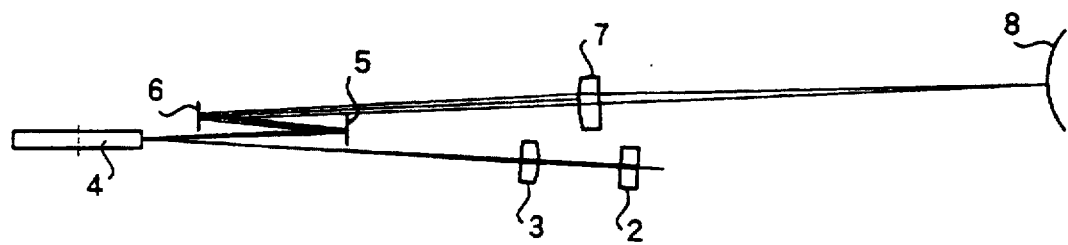
FIG. 5 shows the arrangement of the optical system shown in FIG. 4 in the auxiliary scanning direction.

FIGS. 4 and 5 show the arrangement of a scanning optical system according to the first embodiment. FIG. 4 shows the arrangement of the elements from the polygonal mirror to the photoconductive drum 8, showing the main scanning direction. FIG. 5 shows the same arrangement (the light source portion 1 is not shown) in the auxiliary scanning direction. The concrete construction of the system of this first embodiment is described in TABLE 1. In the table, f denotes the focal length in the main scanning direction; θ0, θ1 and θ2 denote the separation angles; e denotes the off-centered or offset amount of the optical axis of the toric lens from the optical axis of the whole system (a minus sign represents offset to the light source side); ry denotes a radius of curvature in the main scanning direction; rz denotes a radius of curvature in the auxiliary scanning direction (a blank means a rotationally symmetric surface, i.e., rz=ry); d denotes a distance between the surfaces along the optical axis; and n780 denotes the refractive index for 780 nm wavelength light.

In the first embodiment, surface numbers 1 and 2 represent the objective lens 2, surface numbers 3 and 4 represent the cylindrical lens 3, surface number 5 is the polygonal mirror 4, surface number 6 represents the first curved mirror 5, surface number 7 represents the second curved mirror 6, and surface numbers 8 and 9 represent the toric lens 7.

TABLE 1

| f = 240 mm θ0 = 6.0 deg. θ1 = 8.0 deg. θ2 = 8.0 deg. e = −1.21 mm | | | | |
|---|---|---|---|---|
| Surface number | ry | rz | d | n780 |
| 1 | 145.900 | — | 4.000 | 1.51072 |
| 2 | ∞ | — | 20.000 | |
| 3 | ∞ | 35.750 | 4.000 | 1.51072 |
| 4 | ∞ | — | 90.000 | |
| 5 | | | 49.277 | |
| 6 | 155.576 | −426.968 | 35.722 | |
| 7 | −222.195 | 339.813 | 90.000 | |
| 8 | −1422.928 | 33.563 | 5.000 | 1.48617 |
| 9 | −1423.105 | — | 104.942 | |

Figures 6A, 6B, 6C:
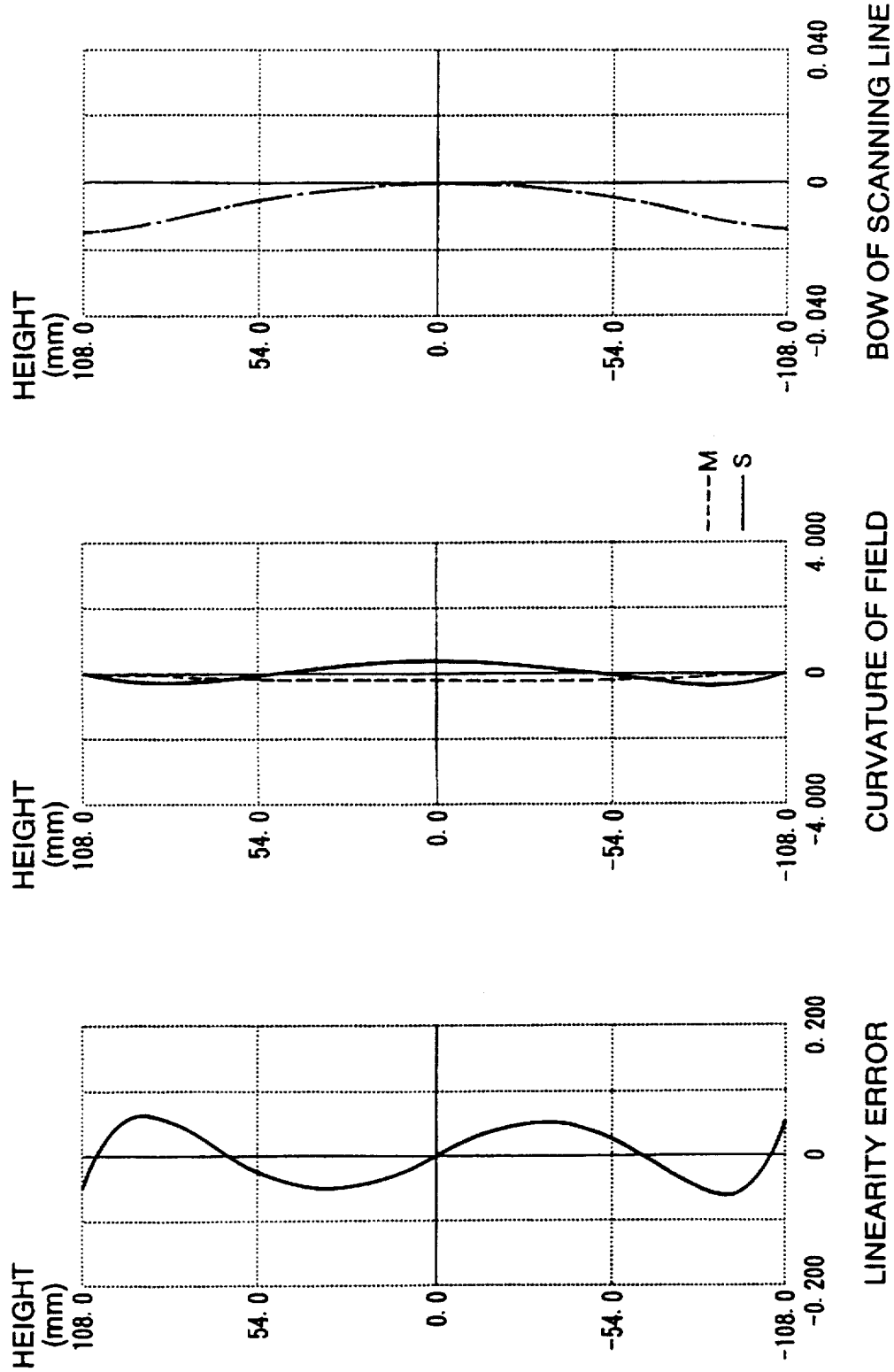
FIGS. 6(A), 6(B) and 6(C) show the linearity error, the curvature of field, and the bow of the scanning line, respectively, according to the first embodiment.

FIGS. 6(A), 6(B) and 6(C) show, respectively, linearity error, curvature of field, and bow (BOW) of the scanning line according to the first embodiment. In each diagram, the vertical axis represents a height on the object surface, and the horizontal axis represents an amount of aberration. The units for both axes are millimeters.

SECOND EMBODIMENT

Figure 7:
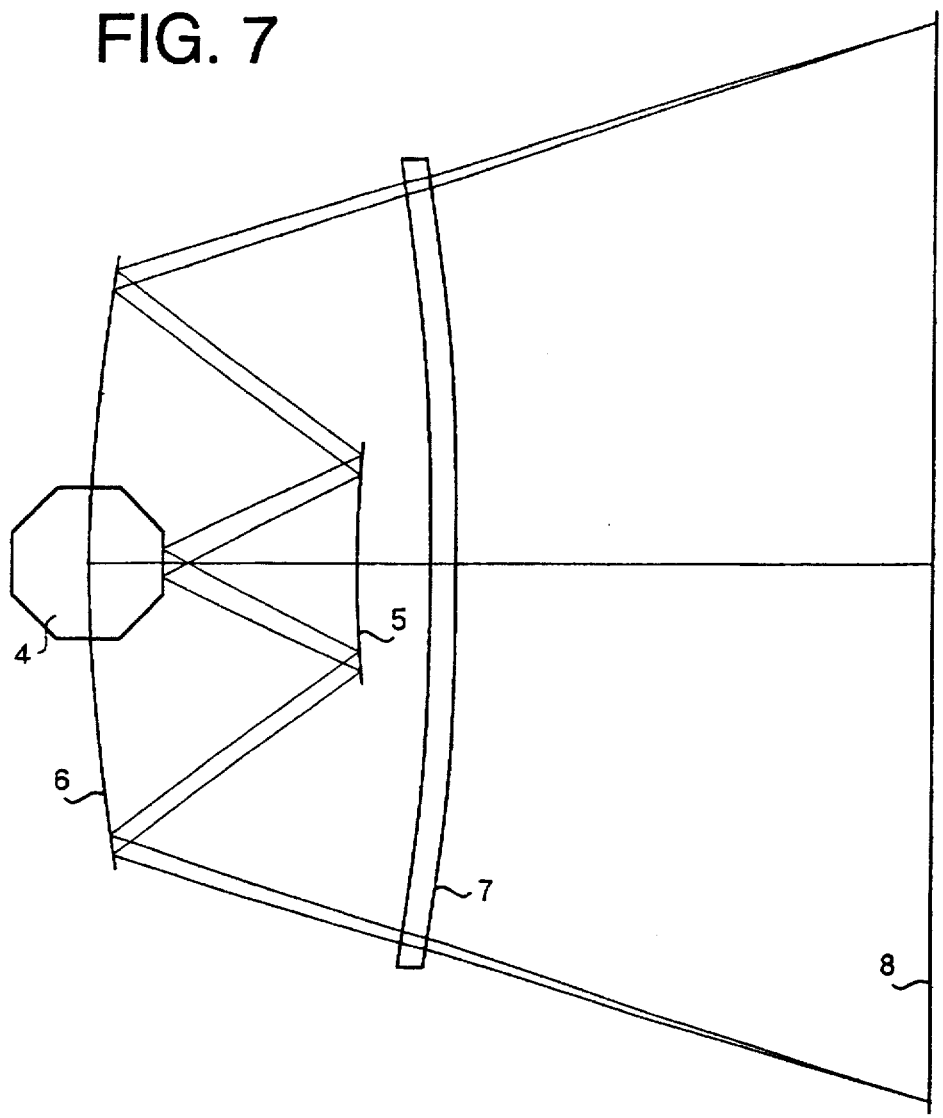
FIG. 7 shows an arrangement of a reflecting type scanning optical system according to a second embodiment, showing the main scanning direction.
Figure 8:
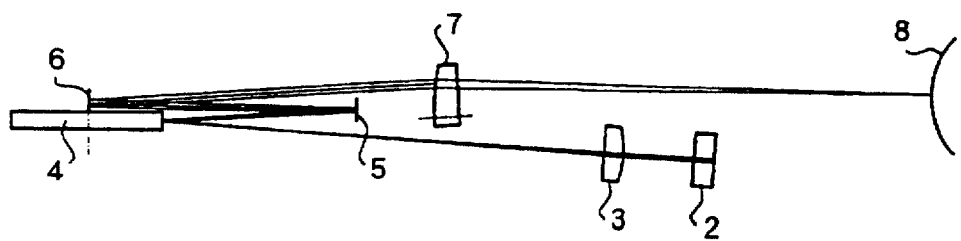
FIG. 8 shows the arrangement of the optical system shown in FIG. 7 in the auxiliary scanning direction.

FIGS. 7 and 8 illustrate a scanning optical system of the second embodiment, in the main and auxiliary scanning directions respectively. The concrete construction of the system of this embodiment is described in TABLE 2. The relationships between the surface numbers and the corresponding optical elements are identical the first In the second embodiments, the curve of the first curved mirror is a non-circular arc in the main scanning direction, the surface of the second curved mirror is a rotationally symmetric aspherical surface. A non-circular arc or an aspherical surface is expressed by the following equation:

$$X = \frac{CY^2}{1 + \sqrt{1-(K+1)Y^2C^2}} + A_4Y^4 + A_6Y^6 + A_8Y^8$$

X is a "sag" (SAG) being a height of the curve measured from the tangential plane at the point where the height from the optical axis is Y. C is a curvature (1/r) of the top of the surface. K is a conic constant and A4, A6 and A8 are aspherical surface coefficients of fourth, sixth and eighth orders. These constants and coefficients are shown in TABLE 3. The radiuses of curvature of the sixth and seventh surface in TABLE 2 are the values at the vertices.

TABLE 2

| f = 240 mm θ0 = 7.0 deg. θ1 = 4.36 deg. θ2 = 4.64 deg. e = −7.19 mm | | | | |
|---|---|---|---|---|
| Surface number | ry | rz | d | n780 |
| 1 | 131.800 | — | 4.000 | 1.51072 |
| 2 | ∞ | — | 14.500 | |
| 3 | ∞ | 35.750 | 4.000 | 1.51072 |
| 4 | ∞ | — | 90.500 | |
| 5 | | | 40.000 | |
| 6 | 227.605 | ∞ | 55.000 | |
| 7 | −370.401 | — | 70.000 | |
| 8 | −500.256 | 45.930 | 5.000 | 1.48617 |
| 9 | −513.192 | — | 96.769 | |

TABLE 3

| Sixth surface (Main scanning direction) | Seventh surface |
|---|---|
| K = 7.5720 | K = 0.0000 |
| A4 = 1.24060*10⁻⁷ | A4 = −2.54360*10⁻⁸ |
| A6 = −2.49863*10⁻¹⁰ | A6 = 2.94927*10⁻¹² |
| A8 = 1.55223*10⁻¹³ | A8 = −2.23829*10⁻¹⁶ |

Figure 9:
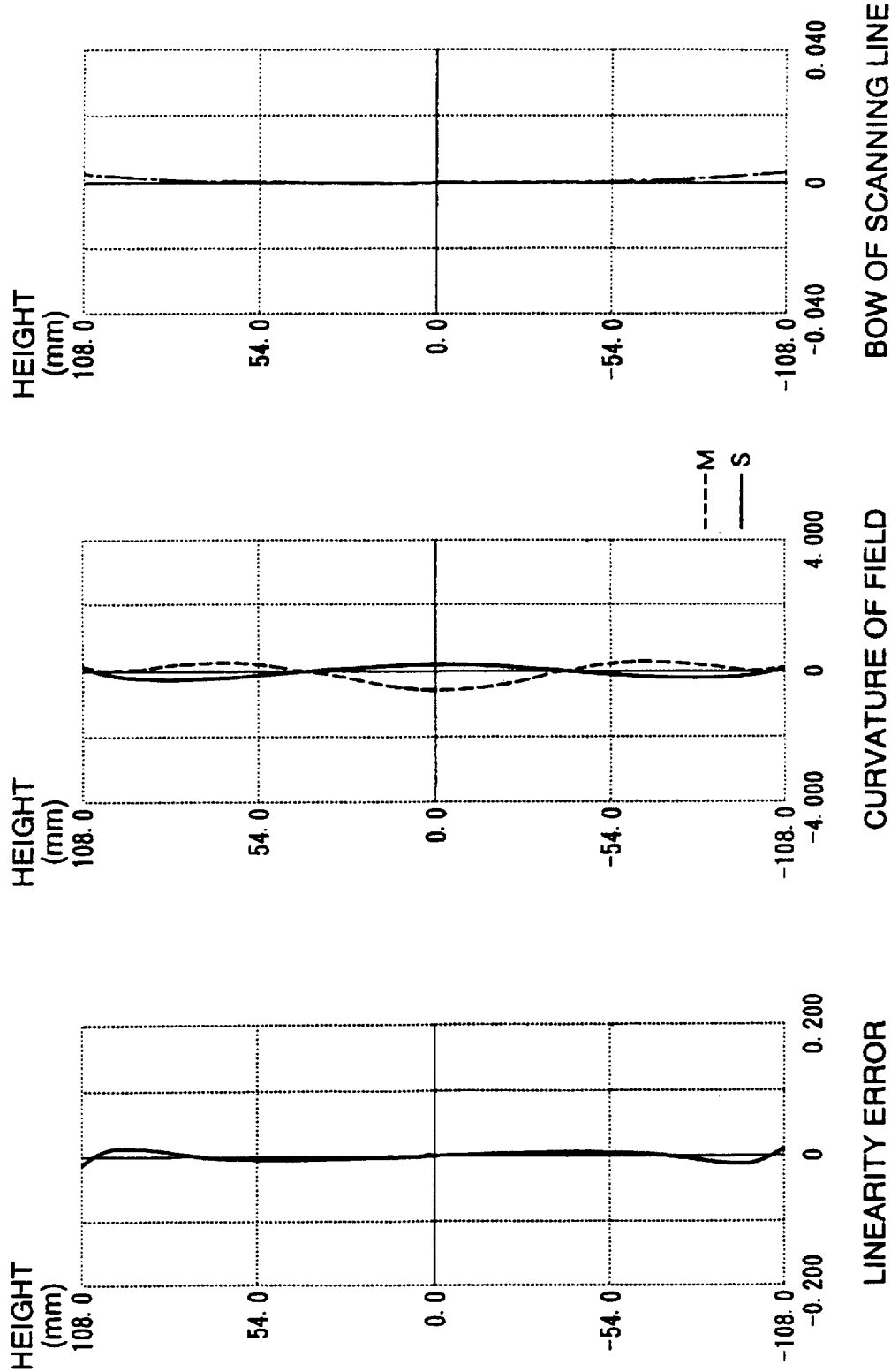
FIGS. 9(A), 9(B) and 9(C) show the linearity error, the curvature of field and the bow of the scanning line, respectively, according to the second embodiment.

FIGS. 9(A), 9(B) and 9(C) show respectively, linearity error, curvature of field, and BOW of the scanning line according to the second embodiment.

THIRD EMBODIMENT

FIGS. 10 and 11 illustrate a scanning optical system of the third embodiment, in the main and auxiliary scanning directions, respectively. The concrete construction of the system of this embodiment is described in TABLE 4. In this third embodiment, surface numbers 1 and 2 represent the cylindrical lens 3, while surface numbers 3 and 4 represent the objective lens 2. The relationships between the other surface numbers and the other corresponding optical elements are identical with those of the first embodiment.

The curve of the first curved mirror is a non-circular arc in the main scanning direction, and the surface of the second curved mirror is a rotationally symmetric aspherical surface. The conic constant and aspherical surface coefficients are shown in TABLE 5.

TABLE 4

| f = 240 θ0 = 7.0 deg. θ1 = 5.56 deg. θ2 = 5.0 deg. e = −5.00 mm | | | | |
|---|---|---|---|---|
| Surface number | ry | rz | d | n780 |
| 1 | ∞ | 55.424 | 2.000 | 1.48617 |
| 2 | ∞ | — | 99.000 | |
| 3 | 104.000 | — | 4.000 | 1.51072 |

TABLE 4-continued f = 240  θ0 = 7.0 deg. θ1 = 5.56 deg. θ2 = 5.0 deg. e = −5.00 mm

| Surface number | ry | rz | d | n780 |
|---|---|---|---|---|
| 4 | ∞ | — | 48.650 | |
| 5 | | | 40.000 | |
| 6 | 265.584 | ∞ | 72.000 | |
| 7 | −421.182 | — | 87.000 | |
| 8 | −1014.316 | 33.318 | 5.000 | 1.48617 |
| 9 | −1018.916 | — | 69.250 | |

TABLE 5

| Sixth surface (Main scanning direction) | Seventh surface |
|---|---|
| K = 6.2884 | K = 0.0000 |
| A4 = 7.74517*10$^{-8}$ | A4 = −1.46434*10$^{-8}$ |
| A6 = −1.96296*10$^{-10}$ | A6 = 1.53665*10$^{-12}$ |
| A8 = 1.45747*10$^{-13}$ | A8 = −1.08116*10$^{-16}$ |

Figures 12A, 12B, 12C:
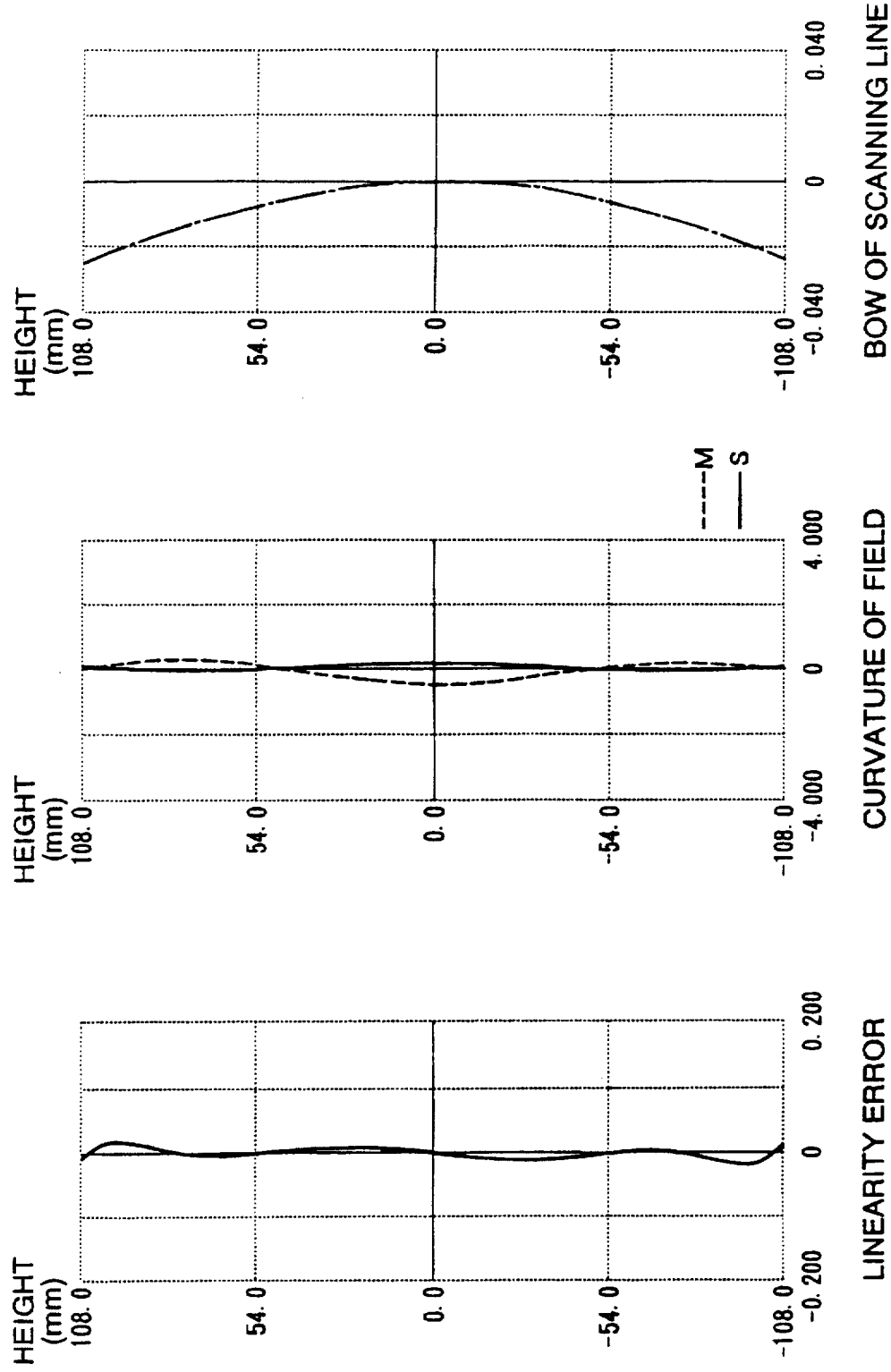
FIGS. 12(A), 12(B) and 12(C) show the linearity error, the curvature of field and the bow of the scanning line, respectively, according to the third embodiment.

FIGS. 12(A), 12(B) and 12(C) show, respectively, the linearity error, curvature of field, and BOW of the scanning line according to the third embodiment.

FOURTH EMBODIMENT

FIGS. 13 and 14 illustrate a scanning optical system of the fourth embodiment, in the main and auxiliary scanning direction, respectively. The concrete construction of the system of this fourth embodiment is described in TABLE 6. The relationship between the surface numbers and the corresponding optical elements are identical with those of first embodiment.

The curve of the first curved mirror is a non-circular arc in the main scanning direction, and the surface of the second curved mirror is a rotationally symmetric aspherical surface. The conic constant and aspherical surface coefficients are shown in TABLE 7.

TABLE 6 f = 240  θ0 = 7.0 deg. θ1 = 6.12 deg. θ2 = 5.2 deg. e = −4.54 mm

| Surface number | ry | rz | d | n780 |
|---|---|---|---|---|
| 1 | 135.320 | — | 4.000 | 1.51072 |
| 2 | ∞ | — | 15.000 | |
| 3 | ∞ | 35.750 | 4.000 | 1.51072 |
| 4 | ∞ | — | 90.000 | |
| 5 | | | 60.000 | |
| 6 | 241.770 | ∞ | 55.000 | |
| 7 | −386.417 | — | 65.000 | |
| 8 | −779.670 | 30.375 | 5.000 | 1.48617 |
| 9 | −785.937 | — | 60.093 | |

TABLE 7

| Sixth surface (Main scanning direction) | Seventh surface |
|---|---|
| K = 6.9332 | K = 0.0000 |
| A4 = 8.28645*10$^{-8}$ | A4 = −2.86913*10$^{-8}$ |
| A6 = −7.78066*10$^{-11}$ | A6 = 2.22489*10$^{-12}$ |
| A8 = 1.98047*10$^{-14}$ | A8 = −1.10817*10$^{-16}$ |

The following TABLE 8 shows the relationship between the powers in the main and auxiliary scanning directions of the first curved mirror 5 for each embodiment. A divergent power is shown with a minus sign, and a convergent power is shown with a plus sign. In each embodiment, condition (1) is satisfied. Therefore, the variation of the separation angle due to the change of the deflecting angle can be reduced.

TABLE 8

| | Pls | Plm |
|---|---|---|
| First Embodiment | 0.00468 | −0.01286 |
| Second Embodiment | 0.00000 | −0.00879 |
| Third Embodiment | 0.00000 | −0.00753 |
| Fourth Embodiment | 0.00000 | −0.00827 |

The present disclosure relates to subject matter contained in Japanese Patent Application No. HEI 07-314729, filed on Nov. 8, 1995, which is expressly incorporated herein by reference in its entirety.

What is claimed is:

1. A reflecting type scanning optical system comprising:
   a rotatable polygonal mirror for reflecting and deflecting a light beam emitted from a light source portion;
   a first curved mirror that has negative power in a main scanning direction, said first curved mirror reflecting the light beam, reflected from said polygonal mirror back toward said polygonal mirror;
   a second curved mirror that has positive power in the main scanning direction, said second curved mirror reflecting the light beam reflected by said first curved mirror toward a surface to be scanned; and
   a toric lens that has positive power at least in an auxiliary scanning direction perpendicular to said main scanning direction, said light beam reflected from said second curved mirror transmitting through said toric lens to form an image on said surface to be scanned,
   wherein said first curved mirror, said second curved mirror, and said polygonal mirror are arranged such that the reflected light beam therefrom is separated from each respective incident light beam in the auxiliary scanning direction.

2. The reflecting type scanning optical system according to claim 1, wherein the following condition is satisfied:

$$Pls > Plm$$

where
   Pls is a power of the first curved mirror in the auxiliary scanning direction; and
   Plm is a power of the first curved mirror in the main scanning direction.

3. The reflecting type scanning optical system according to claim 1, said first curved mirror and said second curved mirror forming a mirror system, wherein the center axis of the incident light beam to said polygonal mirror is included in an auxiliary scanning plane that includes both of an optical axis of the mirror system and a rotation axis of said polygonal mirror.

4. The reflecting type scanning optical system according to claim 1, wherein each incident beam and each reflected beam at said polygonal mirror, said first curved mirror and said second curved mirror are arranged so that the light is reflected in the auxiliary scanning direction away from said light source portion.

5. The reflecting type scanning optical system according to claim 1, wherein the following condition is satisfied:

$$|R1m| < |R2m|$$

where

R1m is a radius of curvature of the first curved mirror in the main scanning direction; and R2m is a radius of curvature of the second curved mirror in the main scanning direction.

6. The reflecting type scanning optical system according to claim 1, wherein an optical axis of said toric lens is off-centered from an optical axis shared by said first curved mirror and said second curved mirror.

7. The reflecting type scanning optical system according to claim 1, wherein said toric lens has substantially no power in said main scanning direction.

8. A reflecting type scanning optical system comprising:

a rotatable polygonal mirror for reflecting and deflecting a light beam emitted from a light source portion;

a first curved mirror that has negative power in a main scanning direction, said first curved mirror reflecting the light beam from said polygonal mirror back toward said polygonal mirror;

a second curved mirror that has positive power in the main scanning direction, said second curved mirror reflecting the light beam reflected by said first curved mirror toward a surface to be scanned;

wherein the following condition is satisfied:

$$|R1m| < |R2m|$$

where

R1m is a radius of curvature of the first curved mirror in the main scanning direction, and R2m is a radius of curvature of the second curved mirror in the main scanning direction, and wherein said polygonal mirror is arranged so that a reflected light beam from said polygonal mirror is separated from an incident light beam at said polygonal mirror in the auxiliary scanning direction.

9. The reflecting type scanning optical system according to claim 8, wherein the following condition is satisfied:

$$P1s > P1m$$

where

P1s is a power of the first curved mirror in the auxiliary scanning direction; and P1m is a power of the first curved mirror in the main scanning direction.

10. The reflecting type scanning optical system according to claim 8, wherein the incident beam and the reflected beam at said polygonal mirror, said first curved mirrors and said second curved mirror, respectively, form separation angles θ0, θ1 and θ2 in the auxiliary scanning direction when said light beam strikes a center, in said main scanning direction, of said surface to be scanned, said first curved mirror and said second curved mirror being arranged so that reflected light is reflected in the auxiliary scanning direction away from said light source portion.

11. The reflecting type scanning optical system according to claim 8, further comprising a toric lens that has positive power at least in an auxiliary scanning direction, said light beam reflected from said second curved mirror transmitting through said toric lens to form an image on said surface to be scanned.

12. The reflecting type scanning optical system according to claim 11, wherein an optical axis of said toric lens is off-centered from an optical axis shared by said first curved mirror and said second curved mirror.

13. A reflecting type scanning optical system comprising:

a rotatable polygonal mirror for reflecting and deflecting a light beam emitted from a light source portion;

a first curved mirror that has negative power in a main scanning direction, said first curved mirror reflecting the light beam deflected by said polygonal mirror buck toward said polygonal mirror; and a second curved mirror that has positive power in the main scanning direction, said second curved mirror reflecting the light beam reflected by said first curved mirror toward a surface to be scanned;

wherein the following condition is satisfied:

$$P1s > P1m$$

where

P1s is a power of the first curved mirror in an auxiliary scanning direction perpendicular to said main scanning direction; and P1m is a power of the first curved mirror in the main scanning direction.

14. The reflecting type scanning optical system according to claim 13, further comprising a cylindrical lens having a positive power in the auxiliary scanning direction, said cylindrical lens being located in the optical path between said light source portion and said polygonal mirror.

* * * * *

UNITED STATES PATENT AND TRADEMARK OFFICE
CERTIFICATE OF CORRECTION

PATENT NO.  : 5,777,774
DATED       : July 7, 1998
INVENTOR(S) : T. IIZUKA

It is certified that error appears in the above-identified patent and that said Letters Patent is hereby corrected as shown below:

column 12, line 3 (claim 10, line 3) of the printed patent, change "mirrors" to ---mirror,---.

column 12, line 26 (claim 13, line 6) of the printed patent, change "buck" to ---back---.

Signed and Sealed this

Thirtieth Day of March, 1999

Attest:

Q. TODD DICKINSON

Attesting Officer

Acting Commissioner of Patents and Trademarks